March 8, 1955 L. W. FALK ET AL 2,703,735

BEARING AND GEAR STABILIZER

Filed June 30, 1950

Inventors
LOUIS W. FALK
WALTER P. SCHMITTER

By Miles Kenninger
Attorney

United States Patent Office 2,703,735
Patented Mar. 8, 1955

2,703,735

BEARING AND GEAR STABILIZER

Louis W. Falk and Walter P. Schmitter, Milwaukee, Wis., assignors to The Falk Corporation, Milwaukee, Wis., a corporation of Wisconsin Application June 30, 1950, Serial No. 171,411

4 Claims. (Cl. 308—26)

This invention relates to rotary shaft bearings, and more particularly to a sleeve type bearing in which a shaft is so supported as to maintain the axis thereof in predetermined relation with the bearing.

In certain mechanisms, such as speed changing gear transmissions in which a driving shaft and a driven shaft are connected by intermeshing gears on the shafts, load transfer from the driving shaft to the driven shaft is not entirely uniform because frequently the duty cycle or the prime mover introduces reversing or varying torque loads. If the driven shaft is mounted on a horizontal axis and rotated in such direction that the tangential load component at the point of tooth mesh is directed upwardly, rapid variations of such upwardly directed load component may subject the driven shaft to radial "chattering" or "fluttering" in its bearings, particularly if such bearings are of the conventional sleeve type lubricated by an oil film between the shaft surface and the bearing surface.

It is accordingly a general object of the present invention to provide an improved rotary shaft bearing of the sleeve type, which will prevent radial movements or "chattering" of the shaft in the bearing.

Another object of the invention is to provide a sleeve type bearing for preventing radial shifting in the bearing of a shaft subjected to intermittent variations in load transmitted and on which a lifting or upwardly directed load component acts.

A further object of the invention is to provide a sleeve type bearing in which the shaft is constantly urged radially towards one side of the bearing, by a substantially uniform force independently of the load on the shaft.

Another object of the invention is to provide a sleeve type bearing in which a spring bias is impressed upon the shaft and may be readily adjusted to meet operating conditions prevailing at any given time.

A further object of the invention is to provide a relatively simple, compact and inexpensive bearing for providing a bias on a shaft in one direction, but which bearing may be readily lubricated in a conventional manner.

Objects and advantages other than those above set forth, will be apparent from the following description when read in connection with the accompanying drawing in which.

Figures 1, 2, 3:
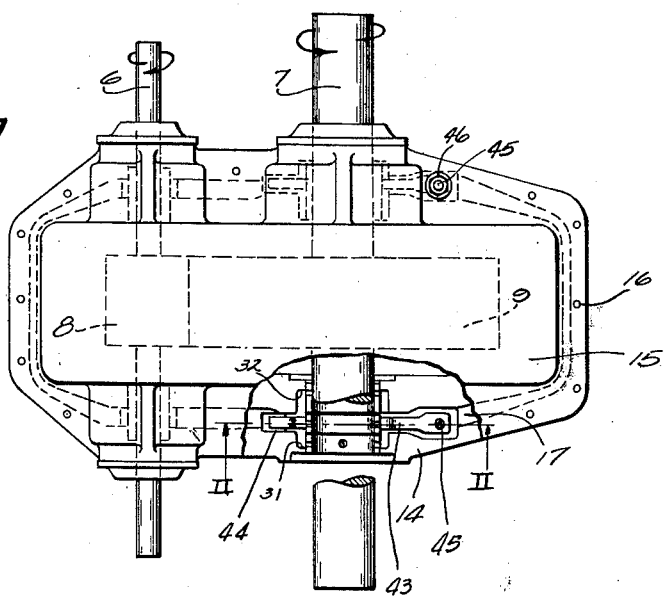
Fig. 1 is a top view of a speed reducer gearing power transmission with parts broken away to show the present bearing incorporated therein.
Fig. 2 is a fragmentary sectional view on line II—II of Fig. 1.
Fig. 3 is a fragmentary sectional view on line III—III of Fig. 2.

Generally, the present invention applies particularly to speed changing gear transmissions in which the driven gear rotates in a direction to produce an upwardly directed load component which, due to variations in the load transmitted between gears, is not uniform. In the present embodiment, the transmission includes a housing in which are supported a driving or power input shaft and gear and a driven or power output shaft and gear. The bearings for the driven shaft are preferably of the sleeve type and severally comprise a semi-cylindrical upper element or section and three semi-cylindrical lower elements or sections jointly equal in length to the upper bearing element. The outer ones of the two lower bearing elements are each fixed in the housing but the center or intermediate lower bearing element is supported on a spring of which the pressure is adjustable from exteriorly of the housing to pre-load the intermediate bearing element by a given amount which is substantially constant for any given adjustment of the spring. Thus the driven shaft and gear are kept in contact with the upper bearing section at all times even though the upward load component alone is not sufficient to overcome the weight of the shaft and gear, and the shaft is thus kept in desired relation in the upper bearing section.

The gear transmission indicated in Fig. 1, is generally of conventional construction in that it comprises a power input shaft 6, a power output shaft 7, a small diameter double helical driving gear 8 secured to the input shaft 6, and a large diameter double helical driven gear 9 on the output shaft 7 and in mesh with the driving gear 8. The shafts are supported by and the gears are enclosed in a housing structure comprising a lower or base housing section 14 (Fig. 2) and an upper or cover housing section 15, detachably secured to the lower section 14, by a circumferential series of bolts indicated at 16 in Fig. 1. The lower housing section 14, provides an open top compartment receiving the gears and has an open top lubricant channel 17 in the upper edge thereof for flow of the lubricant about the compartment, as is usual. The shafts 6 and 7 extend beyond the housing and across the lubricant channel 17 and are rotatably mounted at opposite sides of the gears 8 and 9, in bearings mounted in the housing base section 14 and the cover 15.

Referring now to Figs. 2 and 3, the output or driven shaft 7 rotatably rests in bearings severally comprising two semi-cylindrical lower bearing elements 21 and 22 spaced from each other axially of a journal portion of the shaft 7 as best shown in Fig. 3. The bearing sections 21 and 22 severally comprise a radially outer liner of bronze or the like and a radially inner facing of suitable bearing material such as babbit. Bearing elements 21 and 22 are supported on semi-cylindrical seats formed in the lower housing section wall and extend toward opposite sides of the lubricant channel 17, the bearing elements being retained against rotation relative to the housing section 14 by countersunk screws 23 and 24, respectively, as shown in Fig. 3. As shown in Fig. 1, the lubricant channel 17 is enlarged transversely thereof in proximity to the bearing sections 21 and 22 and is also depressed as shown in Fig. 2, to provide a space between the bearing sections 21 and 22.

The depressed portion of the lubricant channel 17 has a bottom surface 27 and vertical end surfaces 28 and 29. The side walls of the depressed portion of the lubricant channel are indicated in Fig. 1 at 31 and 32 and terminate in vertical edges 33 spaced horizontally by substantial distances from the shaft 6. A drainage hole 36 extends from the bottom of the lubricant channel depressed portion 27—29 and 31—33 into a passage 37 by which lubricant returns from the lubricant channel to the housing section 14.

Within the depressed portion of the lubricant channel between bearing elements 21 and 22, is an auxiliary bearing element 42 generally similar in construction to the lower bearing elements 21 and 22, and located between such elements. The auxiliary bearing element 42 is movable radially of the shaft 6 relative to the housing section 14 and the bearing sections 21 and 22 and has a semi-cylindrical bearing surface for cooperative engagement with the journal portion of the shaft 7 between the bearing sections 21 and 22.

The auxiliary bearing section 42 is urged upwardly into radial load supporting contact with the journal portion of the shaft 7, by a spring bar 43 which extends transversely of the shaft in the vertically recessed portion of the lubricant channel 17. One end of the spring bar 43 rests on an abutment 44 in the lubricant channel 17 of the lower housing section 14, and the other end of the spring bar is supported by the head of a bolt 45 having its shank extending upwardly through the spring bar and through an aperture in the housing cover 15. The upper and threaded end of the bolt 45 carries a nut 46 which may be screwed down against the housing cover 15 to lift and deflect the spring bar 43 by bending it about the auxiliary bearing section 42 and thereby press the auxiliary bearing section upwardly against the shaft 7. A lock washer 47 cooperates with the bolt head and with the spring bar to secure the bolt against turning and a packing 48 which is retained by a follower 49, seals the space between the shank of the bolt and the cover bore through which the bolt extends.

A semi-cylindrical upper bearing element or section 54 is mounted in the housing cover 15 for contact with the journal portion of the shaft 7 above the shaft axis. The upper bearing element also comprises a liner and a facing and extends the full width of all the lower bearing elements as shown in Fig. 3. The housing cover 15 has a lubricant inlet passage 55 therethrough, and an internal semi-annular groove 56 which connects the inlet passage 55 with the lubricant channel 17 at opposite sides, respectively, of the shaft 7.

The auxiliary bearing section 42 has a notch 61 communicating with the lubricant channel 17 at the left side of the shaft 7 in Fig. 2, and a similar notch 62 at the right side of the shaft 7 as shown in Fig. 2, communicating with the lubricant channel 17 at that side of the shaft. The bearing elements 21 and 22 are likewise notched as shown at 63 and 64, respectively.

In operation, the nut 46 is screwed down on the bolt 45 to urge the auxiliary bearing section 42 radially upward against the journal portion of the shaft 7. Consequently, shaft 7 is urged into radial load transmitting engagement, at its upper side, with the main bearing section 54. In other words, the spring bar 43 is preloaded between the supports for the bar on the upper and lower sections of the gear housing, and the degree of preloading may be readily adjusted by means of the nut 46.

Assuming that the input shaft 6 is driven in the direction indicated by the arrow in Fig. 1, the tangential load component at the point of mesh between the teeth of the gears 8 and 9 is upwardly. Consequently, the driven shaft 7 will be subjected to variations of said upwardly directed load component due to load fluctuations being transmitted. The spring bar 43 is preloaded sufficiently by means of the nut 46 so that the upward thrust transmitted by the spring bar 43 and the auxiliary bearing section 42 to the shaft 7 prevents radial chattering or fluttering of the shaft during operation of the transmission. The shaft 7 is, of course, similarly supported on both sides of its gear 9.

It will thus be seen that the present invention provides a construction for minimizing the effect of gravity on a shaft subjected to intermittent forces tending to lift the shaft and thus tending to cause radial movement of the shaft in the sleeve type bearing. The upper half of the bearing and several portions of the lower bearing half are fixed while one portion of the lower bearing half is movable relative to the upper bearing and is under an adjustable constant force urging the movable lower bearing portion and the shaft upward. The upward biasing force on the lower movable portion of the bearing is stiffly resilient to tend to maintain the shaft in contact, except for the oil film, with the upper bearing portion. Hence, variations in or even cessation of the lifting component on the shaft, does not cause the shaft to drop down into the fixed lower bearing portions. Impacts of the shaft in the lower bearing are thus eliminated when the lifting load component and the spring force equal the weight of the shaft, and are cushioned when the weight of the shaft exceeds the lifting component plus the spring force. The invention is applicable in various relationships and is disclosed in connection with a geared speed reducer power transmission only as one specific construction in which the invention has an especially useful effect.

Although but one embodiment of the present invention has been illustrated and described, it will be apparent that various changes and modifications may be made therein without departing from the invention as defined in the appended claims.

We claim:

1. A sleeve bearing for a rotary shaft mounted in a housing and subjected to forces tending to lift the shaft by varying amounts depending on variations in load on the shaft, the bearing comprising a single fixed semi-cylindrical upper bearing element, a pair of fixed semi-cylindrical lower bearing elements spaced axially of the shaft and severally having an end co-planar with the ends of the upper bearing element for defining a space of greater diameter than the diameter of the shaft by an amount sufficient to provide an annular oil film space, a radially movable substantially semi-cylindrical bearing element between the fixed lower bearing elements and in spaced relation therewith, the movable bearing element having the edges thereof spaced from the fixed upper bearing element when in use, a spring bar supported at one end on the housing for rocking about an axis and supporting the movable lower bearing element, and a screw adjustably mounted on the housing and supporting the other end of the bar spring in space for varying the upward pressure of the spring on the movable bearing element while avoiding lateral shifting and tilting of the movable bearing element, the spring and screw tending to raise the movable lower bearing element upon decrease in the lifting force on the shaft below the force of gravity acting on the shaft.

2. A sleeve bearing for a rotary shaft mounted in a housing and subjected to forces tending to lift the shaft by varying amounts, the bearing comprising a single fixed semi-cylindrical upper bearing element, a pair of fixed semi-cylindrical lower bearing elements spaced axially of the shaft for defining a space for an annular oil film space about the shaft, a diametrically movable substantially semi-cylindrical bearing element between the fixed lower bearing elements and in spaced relation therewith axially of the shaft, the movable bearing element having the edges thereof spaced from the fixed upper bearing element when in use, an elongated resilient member supported at one end on the housing and urging the movable lower bearing element toward the shaft, and means mounted on the housing for adjustably supporting the other end of the resilent member in space and thereby varying the action of the resilient member on the movable bearing element while avoiding lateral shifting and tilting of the movable bearing element, the resiilent member tending to raise the movable lower bearing element upon decrease in the lifting force on the shaft below the force of gravity acting on the shaft.

3. In a power transmission gear set including a housing having a gear-supporting shaft journalled horizontally therein, the combination of a substantially cylindrical sleeve bearing fixed in the housing and in which said shaft is journalled for support thereby, the bearing having an internal diameter to provide a substantially annular oil-film space between the sleeve and the shaft, the bearing including a diametrically movable section constituting part of the lower portion of the bearing but being separate from other parts of the bearing, a resilient supporting member reacting on said movable section in a direction to substantially sustain the weight of said shaft and gear to thereby stabilize said shaft against radial displacement in said bearing by forces resulting from variations in torque reactions on said gear, and means mounted on the housing and accessible exteriorly thereof for adjusting the position of the resilient member and thereby varying the action thereof on the movable bearing section without lateral or tilting movement of the movable bearing section.

4. In a power transmission gear set including a housing having a gear-supporting shaft journalled horizontally therein, the combination of a substantially cylindrical sleeve bearing fixed in the housing and in which said shaft is journalled for support thereby, the bearing having an internal diameter providing a substantially annular oil-film space between the sleeve and the shaft, the bearing including a substantially semi-cylindrical section constituting an intermediate part of the lower portion of the bearing free from the other parts of the lower bearing portion, and a resilient bar rigidly supported at its ends within the housing and having a resilient intermediate portion pressing the movable bearing section in a direction to substantially sustain the weight of said shaft and gear.

References Cited in the file of this patent

UNITED STATES PATENTS

| | | |
|---|---|---|
| 1,057,648 | Lindhard | Apr. 1, 1913 |
| 1,162,125 | Bassett | Nov. 30, 1915 |
| 1,170,057 | Farnum | Feb. 1, 1916 |
| 1,280,839 | Rathbun | Oct. 8, 1918 |
| 1,411,127 | Stephens | Mar. 28, 1922 |
| 1,870,857 | Mathewson | Aug. 9, 1932 |

FOREIGN PATENTS

| | | |
|---|---|---|
| 372,419 | Great Britain | May 12, 1932 |
| 592,812 | Great Britain | Sept. 30, 1947 |